United States Patent
Lu et al.

(10) Patent No.: US 6,813,813 B2
(45) Date of Patent: Nov. 9, 2004

(54) COLLAPSIBLE HINGE BRACKET FOR A LAPTOP COMPUTER

(75) Inventors: Sheng-Nan Lu, Shulin (TW); Hsiang-Chi Chien, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/337,812

(22) Filed: Jan. 6, 2003

(65) Prior Publication Data

US 2004/0128795 A1 Jul. 8, 2004

(51) Int. Cl.[7] .............................................. E05D 11/08
(52) U.S. Cl. .............................. 16/342; 16/334; 16/374; 16/340
(58) Field of Search .......................... 16/340, 342, 334, 16/335, 336, 332, 374; 403/146; 248/291.1, 292.12, 292.13, 292.14, 447, 457–458, 917, 919–923; 361/680, 681, 683

(56) References Cited

U.S. PATENT DOCUMENTS

| | | | | |
|---|---|---|---|---|
| 5,190,391 A | * | 3/1993 | Huong | 403/96 |
| 6,154,925 A | * | 12/2000 | Miura | 16/338 |
| 6,253,419 B1 | * | 7/2001 | Lu | 16/340 |
| 6,421,878 B1 | * | 7/2002 | Kaneko et al. | 16/330 |
| 6,453,509 B1 | * | 9/2002 | Shin | 16/340 |
| 6,539,582 B1 | * | 4/2003 | Chae | 16/340 |
| 6,618,903 B2 | * | 9/2003 | Kim | 16/337 |
| 6,666,422 B1 | * | 12/2003 | Lu et al. | 248/291.1 |
| 6,671,928 B2 | * | 1/2004 | Huang | 16/340 |

FOREIGN PATENT DOCUMENTS

| | | | | | |
|---|---|---|---|---|---|
| JP | 06330668 A | * | 11/1994 | | E05D/11/08 |
| JP | 2001099133 A | * | 4/2001 | | F16C/11/04 |
| JP | 2002266841 A | * | 9/2002 | | F16C/11/10 |

* cited by examiner

Primary Examiner—Chuck Y. Mah
(74) Attorney, Agent, or Firm—Dellett & Walters

(57) ABSTRACT

A hinge bracket has a pad immovable relative to the leg of the frame and has extensions protruding out from a surface of the pad. A positioning disk is pivotable relative to the pad and has two pairs of notches to alternately receive the extensions such that the frame which is adapted to support an LCD screen is able to be supported at an upright position or in parallel relative to the base.

2 Claims, 7 Drawing Sheets

US 6,813,813 B2

COLLAPSIBLE HINGE BRACKET FOR A LAPTOP COMPUTER

BACKGROUND OF THE INVENTION

1. Field of the Invention

The present invention relates to a collapsible hinge bracket for a laptop computer, and more particularly to a collapsible hinge bracket that is able to be folded to save space for storage or transportation.

2. Description of Related Art

A conventional hinge bracket is provided between the screen and the panel of a laptop computer to allow the screen to pivot relative to the panel. Normally, after the hinge bracket is mounted on the laptop computer, the hinge bracket is able to provide necessary friction to the screen so as to support the screen at a predetermined position or to provide reasonable space for the screen to pivot with respect to the panel so that the screen is able to engage with the panel. However, prior to assembly of the hinge with the other components, storage of stock hinges is hindered by their size and this is inconvenient and expensive for manufacturers.) This is because, when the hinge bracket is not assembled on the laptop computer, the conventional hinge bracket, within a limited space to pivot, takes large space when storage or transportation becomes necessary, which is a great concern for the manufacturer when the issue turns to cost.

To overcome the shortcomings, the present invention tends to provide an improved hinge bracket for a laptop computer to mitigate and obviate the aforementioned problems.

SUMMARY OF THE INVENTION

The primary objective of the present invention is to provide an improved hinge bracket which is collapsible so that the bracket is able to be folded in parallel with the base of the hinge bracket such that the space taken by the hinge bracket when transported or stored is minimized. Therefore, the user is able to have more room available to store hinge brackets than before.

In order to accomplish the foregoing objective, the hinge bracket has a pad with two extensions oppositely formed on a surface of the pad and a positioning disk with a finger extending into a cutout defined in a leg of the bracket and two pairs of notches peripherally defined to correspond to the extensions respectively such that when the positioning disk pivots relative to the pad, the two extensions are alternately received in the two pairs of notches to either support the bracket in an upright position or in parallel relative to the base. Therefore, the hinge bracket is able to support an LCD screen at the upright position when the hinge bracket is in use and is in parallel with respect to the base when the hinge bracket is stored or transported.

Other objects, advantages and novel features of the invention will become more apparent from the following detailed description when taken in conjunction with the accompanying drawings.

DETAILED DESCRIPTION OF THE PREFERRED EMBODIMENT

Figure 1:
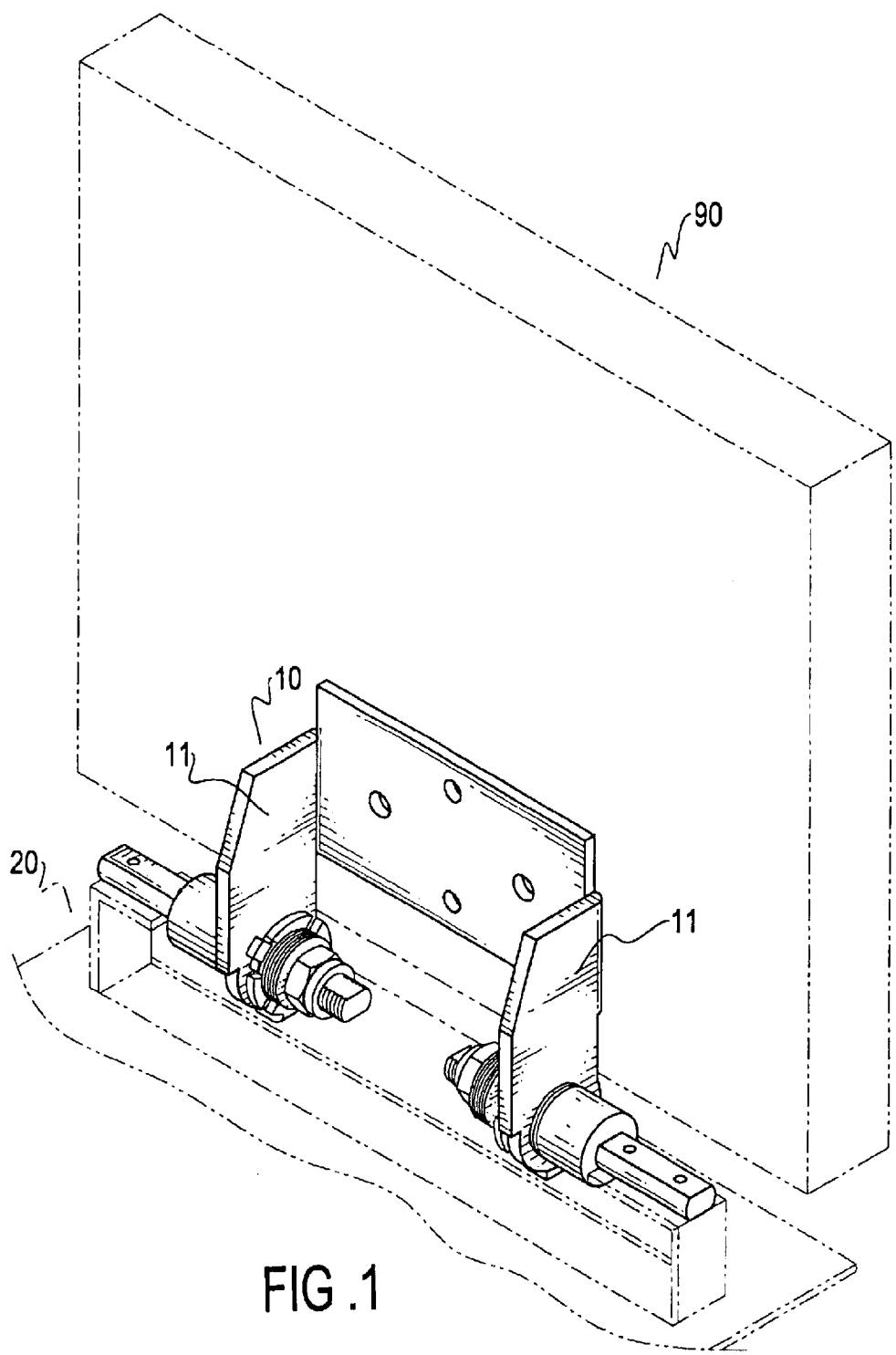
FIG. 1 is a schematic view showing that the hinge bracket of the present invention is applied to support an LCD screen.

With reference to FIG. 1, the hinge bracket in accordance with the present invention is employed to support an LCD screen (90) (in dashed lines). The hinge bracket of the present invention includes a frame (10) to be firmly fixed to the screen (90) and a base (20) to be firmly stood on a surface, i.e. a table or a desk.

Figure 2:
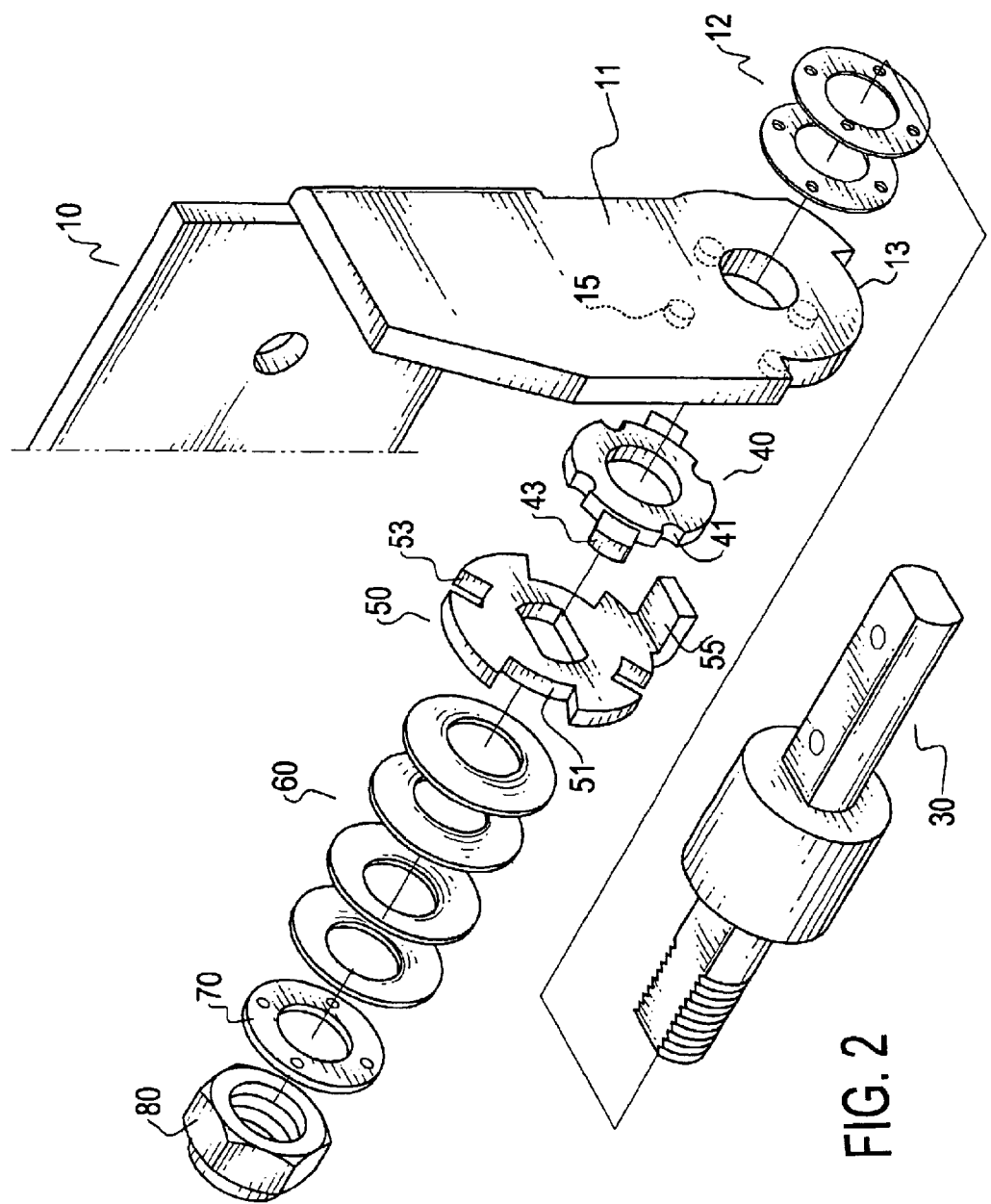
FIG. 2 is an exploded perspective view of the hinge bracket showing parts of the hinge bracket.

With reference to FIG. 2, the hinge bracket of the present invention further has a bolt (30), a pad (40), a positioning disk (50), multiple leaf springs (60) and a nut (80).

The frame (10) has two legs (11) respectively formed on opposite side faces of the frame (10). Each leg (11) has a limit notch (13) and bosses (15) formed on a side face of the leg (11). Multiple first washers (12) are applied to a side face of the leg (11) opposite to the side face of the bosses (15).

The pad (40) has cutouts (41) peripherally defined in the pad to correspond to the bosses (15) of the leg (11) and a pair of extensions (43) respectively extending out in opposite directions with respect to each other.

The positioning disk (50) has a first pair of notches (51) and a second pair of notches (53) respectively and peripherally defined in the positioning disk (50) to alternately correspond to the extensions (43) of the pad (40). A finger (55) integrally extends out into the limit cutout (13) of the leg (11).

One end of the bolt (30) is able to be firmly fixed to the base (20) and the other end of the bolt (30) is able to extend through the first washers (12), the leg (11), the pad (40), the positioning disk (50), the leaf springs (60), a second washer (70) and into the nut (80) to securely combine the aforementioned parts on sides of the leg (11).

Figure 3:
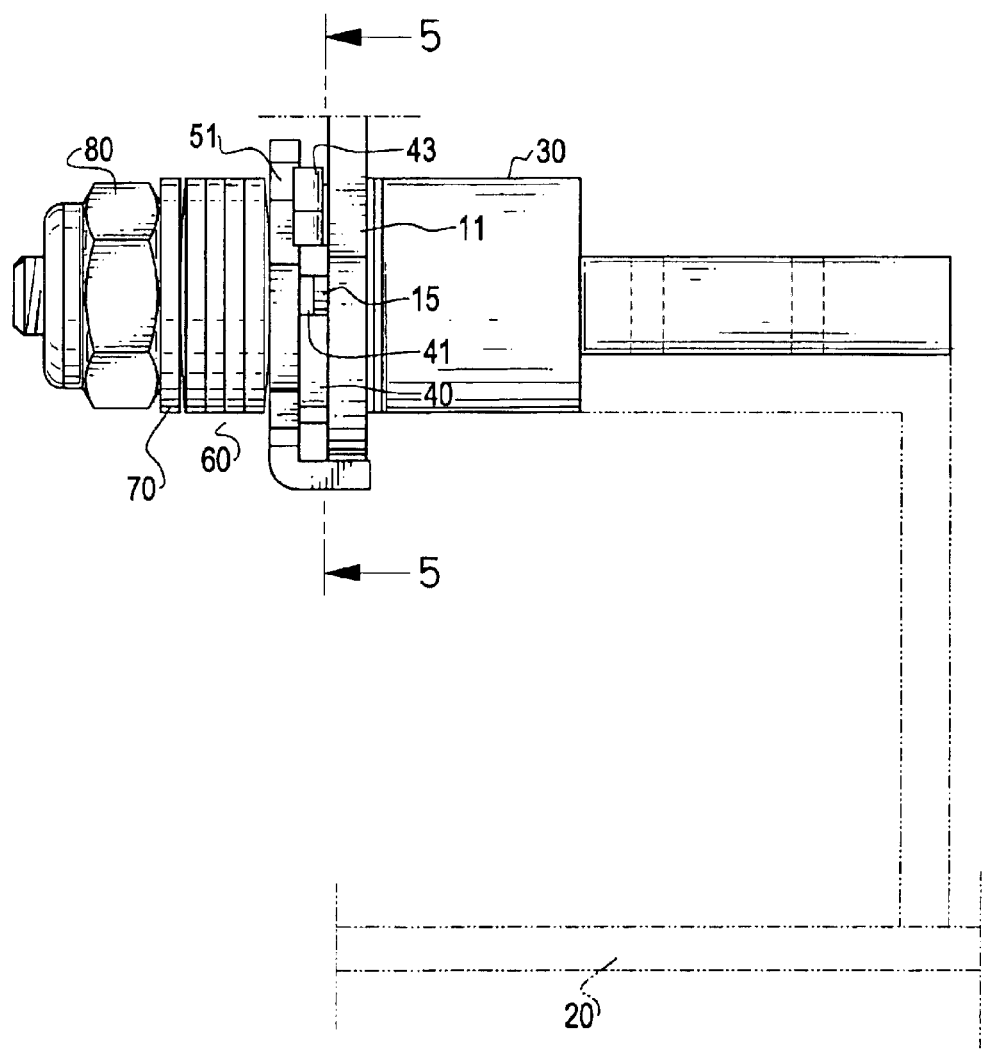
FIG. 3 is a side plan view showing the relationship between the pad and the positioning disk.

With reference to FIG. 3, after the hinge bracket of the present invention is assembled, it is noted that because the extensions (43) of the pad (40) protrude out of the surface of the pad (40), the extensions (43) are received in the first notches (51) (or the second notches (53)) of the positioning disk (50).

Figure 4:
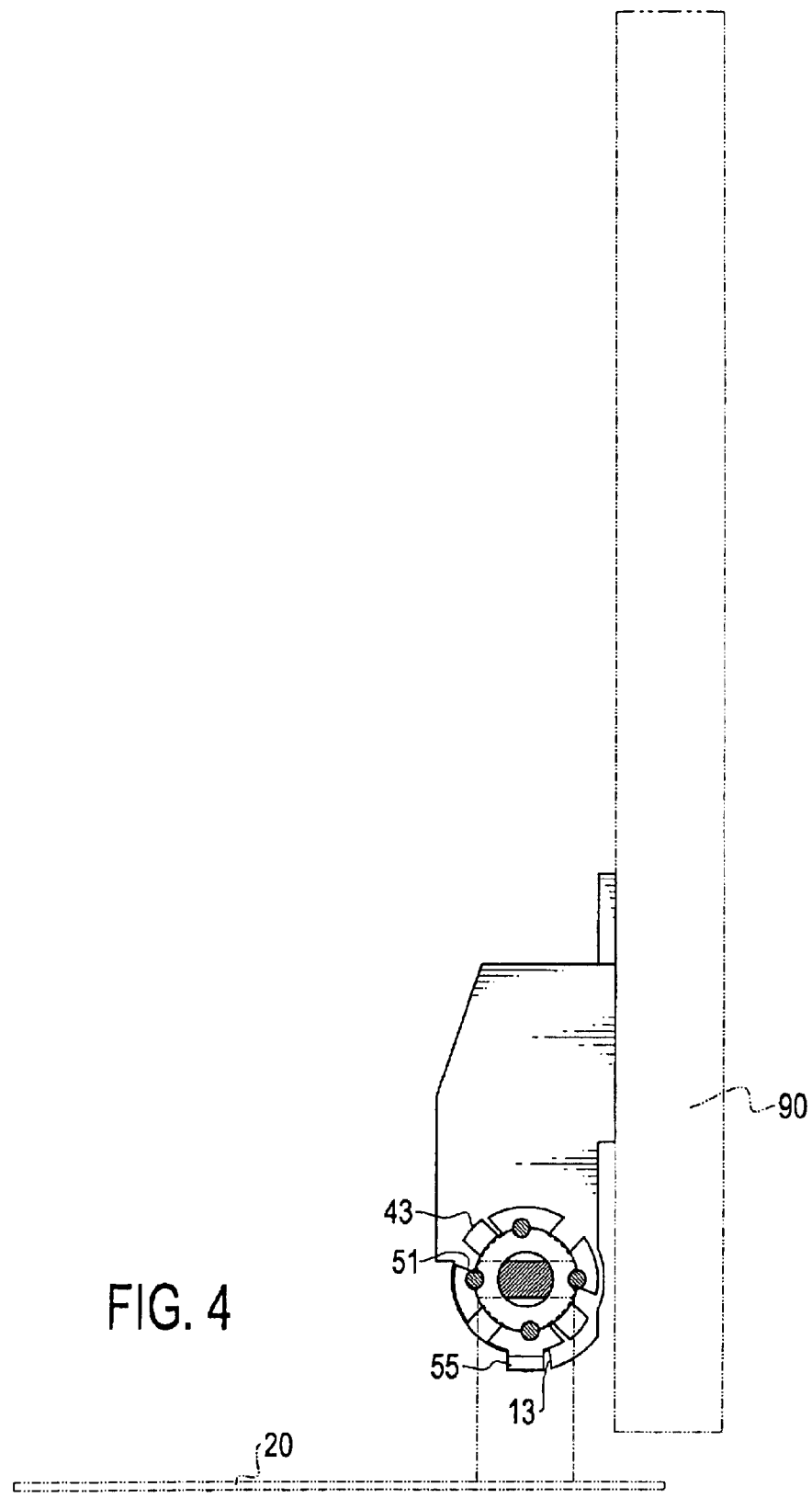
FIG. 4 is a schematic view showing the relationship between the pad and the positioning disk when the LCD screen is vertical relative to the base.
Figure 5:
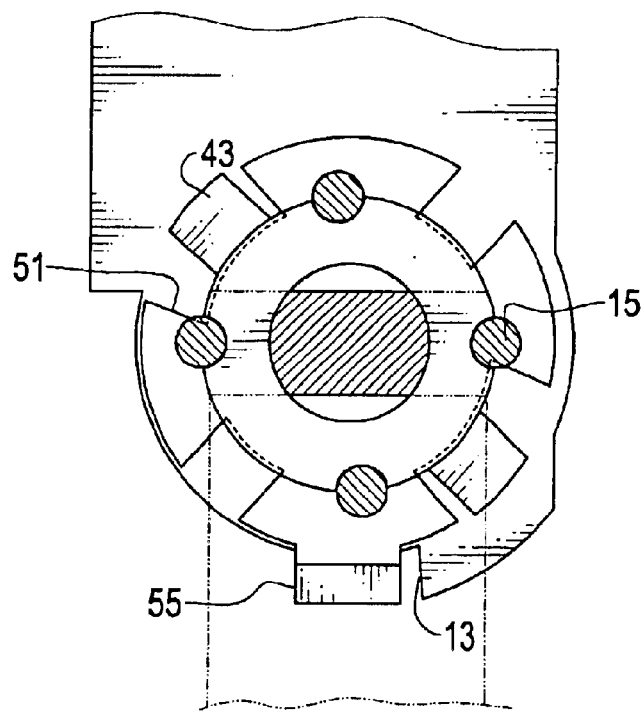
FIG. 5 is an enlarged schematic view of the relationship in FIG. 4.

With reference to FIGS. 4 and 5, when the LCD screen (90) is upright relative to the base (20), the extensions (43) are received in the first notches (51) and the finger (55) abuts a side face of the limit cutout (13) of the leg (11) so as to provide a supporting force to support the LCD screen (90) in the upright position.

Figure 7:
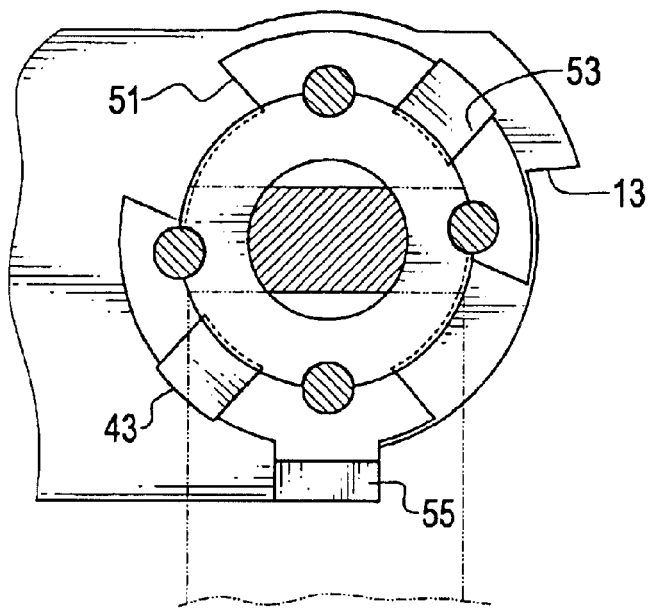
FIG. 7 is an enlarged schematic view of the relationship in FIG. 6.
Figure 6:
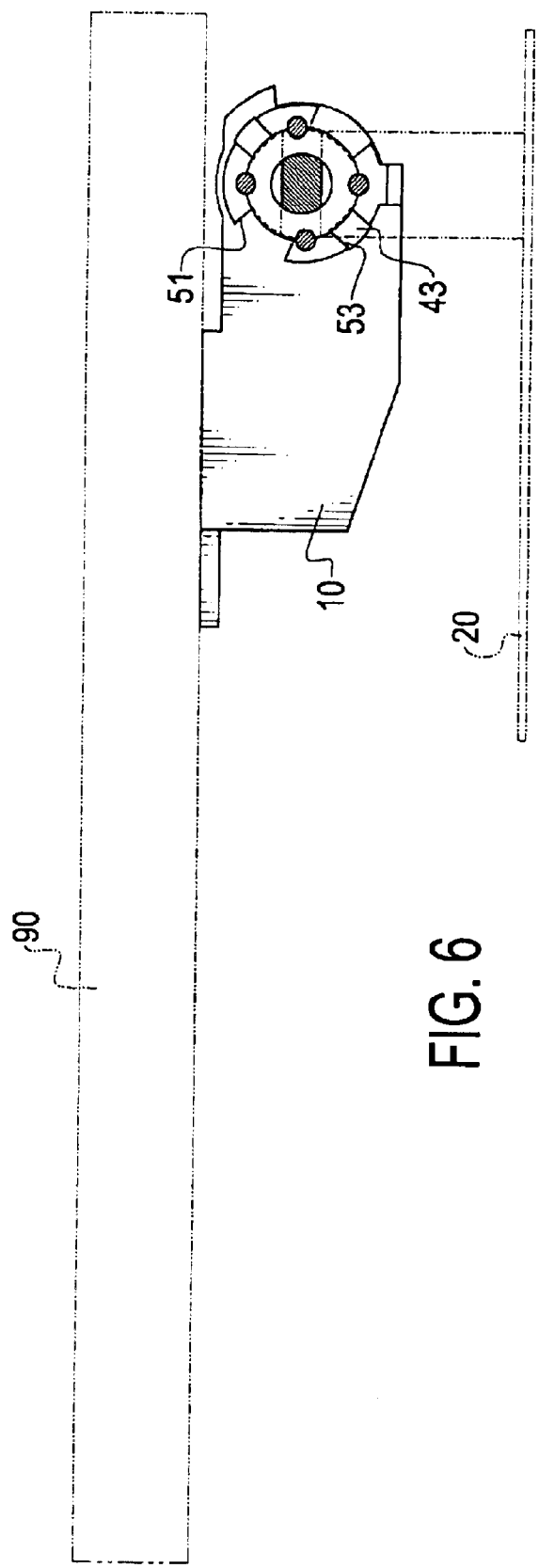
FIG. 6 is a schematic view showing the relationship between the pad and the positioning disk when the LCD screen is parallel relative to the base.

With reference to FIGS. 6 and 7, when the frame (10) pivots relative to the base (20), the extensions (43) gradually move from the first notches (51) to the second notches (53). When the extensions (43) finally are received in the second notches (53), the frame (10) is in parallel in relation to the base (20) and the finger (55) abuts the other side of the limit cutout (13) of the leg (11). While the extensions (43) are moving from the first notches (51) to the second notches (53), the engagement between the surface of the positioning disk (50) and the extensions (43) provides necessary friction to support the LCD screen (90) at any desired angle.

After the frame (10) is in parallel to the base (20), the space taken by the hinge bracket is minimized so that more of the present hinge bracket can be stored in the same space as prior art brackets, thereby lowering costs of storage and transportation.

Figure 8A:
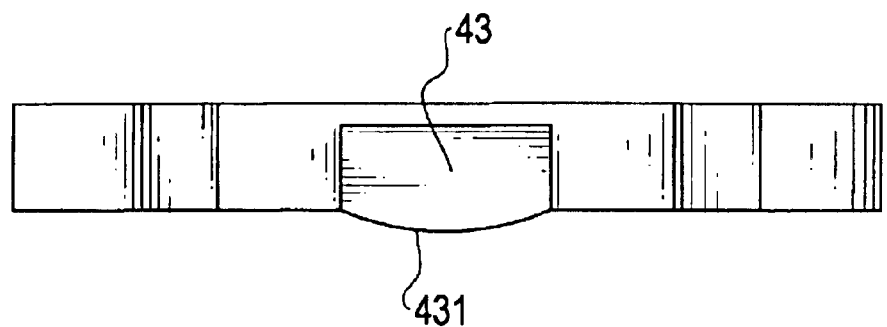
FIGS. 8A and 8B are schematic views showing different embodiment of the extensions.
Figure 8B:
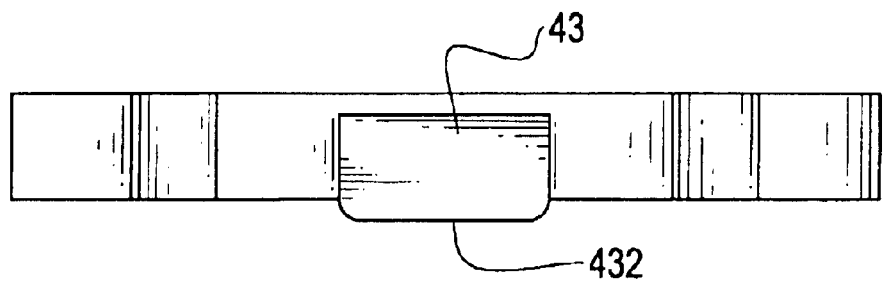

With reference to FIGS. 8A and 8B, it is noted that in order to facilitate movement of the extensions (43) to the positioning disk (50), each of the extensions (43) has a domed top face (431), as shown in FIG. 8A, or rounded corners (432), as shown in FIG. 8B.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a collapsible hinge bracket having a frame provided with two legs respectively formed on opposite sides of the frame and each having, a limit cutout defined in a periphery of the leg, a base pivotally connected to the frame, first washers provided on a side of one of the legs, a pad provided on the other side of the leg, a positioning disk adjacent to the pad and pivotable relative to the pad, wherein the positioning disk has a finger extending to the limit cutout to limit pivotal movement of the positioning disk relative to the pad, multiple leaf springs adjacent to the positioning disk to sandwich the positioning disk with the pad, a second washer adjacent to one of the leaf springs and a bolt one and of which extends through the first washers, said one leg, the pad, the positioning disk, the leaf springs, the second washer and into a nut to securely combine the first washers on one side of said one leg and the pad, the positioning disk, the leaf springs and the second washer on the other side of said one leg and other end of which securely connects to the base, wherein the improvement comprises:

the leg has multiple bosses formed on a side face of said one leg and the pad has multiple cutouts peripherally defined in the pad to correspond to the bosses such that after the bosses are received in the corresponding cutouts of the pad, the pad is immovable relative to said one leg, the pad has a pair of extensions respectively extending to opposite directions and each extension protrude out of a surface of the pad, the positioning disk has a pair of first notches and a pair of second notches alternately corresponding to the pair of extensions so that the frame is able to be supported at an upright position or in parallel relative to the base.

2. The hinge bracket as claimed in claim 1, wherein each of the extensions has a domed top face to facilitate movement of the extension along the positioning disk.

* * * * *